Figure 1:
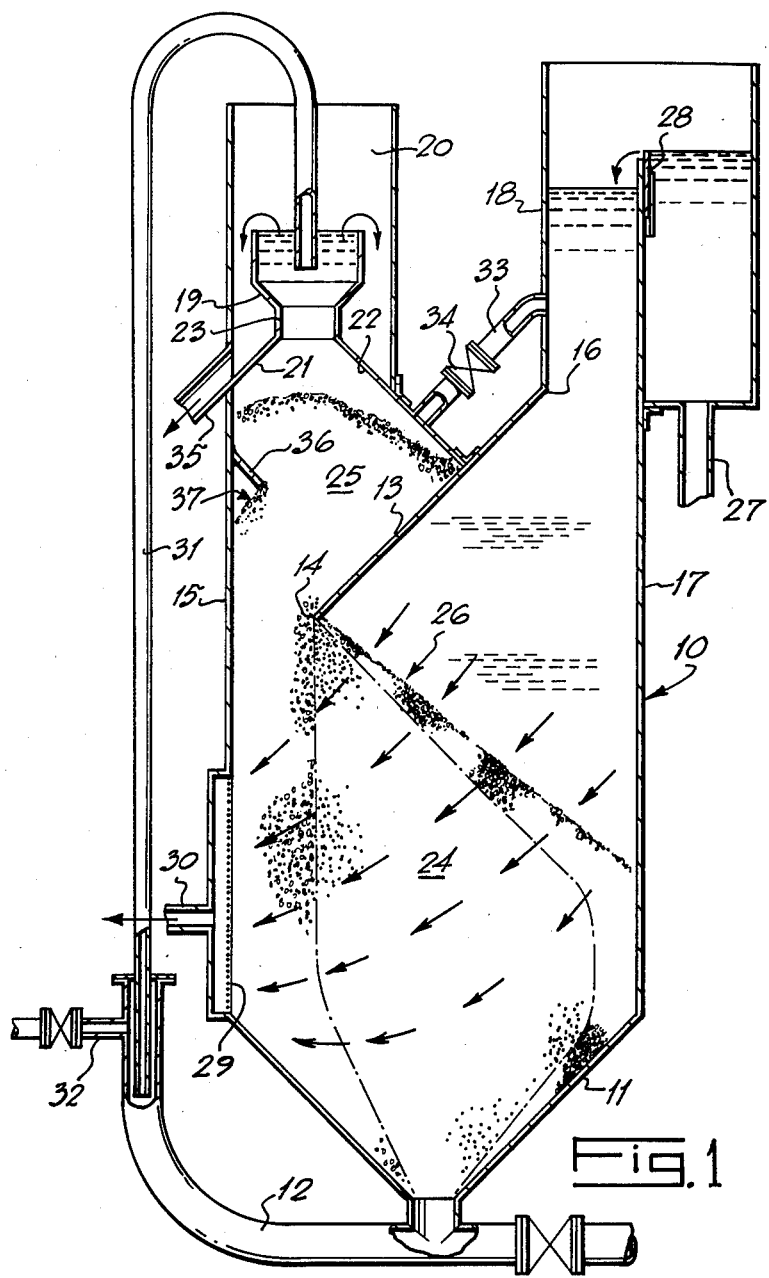

United States Patent [19]

Austin et al.

[11] 4,060,484

[45] Nov. 29, 1977

[54] FILTERS

[75] Inventors: Eric Paul Austin, Sandbach; John Trevor Allanson, Alsager, both of England

[73] Assignee: Simon-Hartley Limited, Stockport, England

[21] Appl. No.: 642,313

[22] Filed: Dec. 19, 1975

[30] Foreign Application Priority Data

Aug. 25, 1973 United Kingdom .......................40368

Related U.S. Application Data

[63] Continuation of Ser. No. 488,819, July 15, 1974, abandoned.

[51] Int. Cl.² ............................................. B01D 23/16
[52] U.S. Cl. ...................................... 210/80; 210/189; 210/268; 210/279; 210/285
[58] Field of Search ...................... 210/33, 79, 80, 189, 210/268, 279, 285

[56] References Cited

U.S. PATENT DOCUMENTS

| 1,007,929 | 11/1911 | Deacon et al. | 210/189 X |
| 1,123,704 | 1/1915 | Deacon et al. | 210/189 |
| 1,620,431 | 3/1927 | Bramwell | 210/189 |
| 1,861,295 | 5/1932 | Bramwell | 210/189 |
| 2,057,887 | 10/1936 | Elliot et al. | 210/33 X |
| 3,715,868 | 2/1973 | Biasi | 210/268 X |

FOREIGN PATENT DOCUMENTS

| 263,183 | 2/1912 | Germany | 210/189 |
| 449,431 | 1/1925 | Germany | 210/189 |

Primary Examiner—Thomas G. Wyse
Assistant Examiner—R. G. Mukai
Attorney, Agent, or Firm—Norris & Bateman

[57] ABSTRACT

A method of filtering a liquid comprising the steps of providing a bed of particulate material, withdrawing material from the base of the bed, supplying replacement particulate material to the bed in such a manner that the bed has a free inclined upper surface, and causing the liquid to be filtered to flow through the bed by entering the same through said inclined upper suface, and apparatus for carrying out such method. Preferably the particulate material is comprised by particles of various sizes whereby a classifying action takes place to give a structured filter bed.

9 Claims, 2 Drawing Figures

FILTERS

This is a continuation of application Ser. No. 488,819, filed July 15, 1974, and now abandoned.

This invention relates to the filtration of liquids and more particularly, though not exclusively, to the removal of suspended solids from sewage effluents at tertiary treatment stages.

The most common method of filtering a liquid for removing suspended contaminants is by causing the liquid to flow through a horizontally extending bed of particulate filter material, such as sand. This method has a serious disadvantage in that the filtration process must be arrested frequently and the filter material back-washed.

Proposals have been made to filter liquid by horizontal flow through a bed in the form of a vertical column of sand, which is continuously moved downwardly, sand from the base of the bed being recovered, washed and re-cycled to the head of the bed. We have found that filtration by this process is not particularly satisfactory, since the filter material bed can become blinded very rapidly. Attempts to move the column of sand more quickly, to compensate for this, cause problems in that the filter bed ceases to be well-packed and thus ceases to constitute an effective filter.

It is an object of the present invention to provide a novel filtering method, and apparatus for carrying the same into effect, which overcomes at least to some extent the disadvantages aforesaid.

With this object in view, the present invention provides, as a first feature thereof, a method of filtering a liquid comprising the steps of providing a bed of particulate material, withdrawing material from the base of the bed, supplying replacement particulate material to the bed in such a manner that the bed has a free inclined upper surface, and causing the liquid to be filtered to flow through the bed by entering the same through said inclined upper surface.

As a second feature, the invention further provides filtration apparatus comprising a filtration vessel which contains a bed of particulate material, means for withdrawing material from the base of the bed, means for supplying replacement particulate material to the bed in such a manner that the bed has a free inclined upper surface, and means for causing the liquid to be filtered to flow through the bed to a filtrate outlet by entering the bed through said free inclined upper surface.

The invention will be described further with reference to the accompanying drawings, which show, by example only, two embodiments of the filtration apparatus of the invention.

Figure 2:
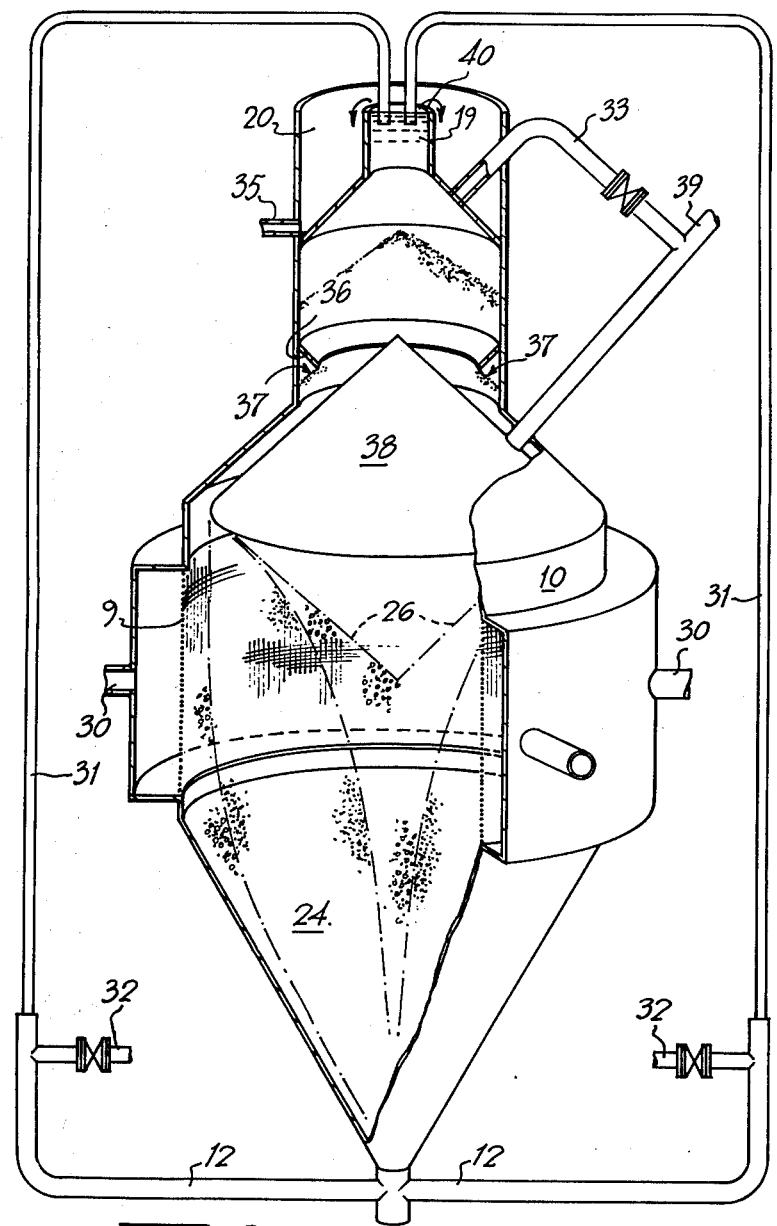

In the drawings:

FIG. 1 shows a vertical cross-section through a first embodiment of the apparatus of the invention, comprising a filter vessel of rectangular horizontal cross-section; and FIG. 2 shows a partially cut-away perspective view of a second embodiment of the apparatus comprising a filter vessel of circular horizontal cross-section.

Referring firstly to FIG. 1, it will be seen that this embodiment of the apparatus of the invention essentially comprises a vertically extending filter vessel, generally indicated at 10. The vessel 10 is of substantially rectangular horizontal cross-section, which reduces at the extreme lower end 11 of the vessel to communicate with a pipe 12, to be referred to hereinafter.

An inclined baffle plate 13 extends within the vessel 10, between opposite end walls thereof, and is arranged so that its lower edge 14 is spaced from a side wall 15 of the vessel 10. Its upper edge 16 is likewise spaced from the opposite side wall 17 of the vessel 10 but is connected with a vertical plate 18, which extends upwardly therefrom over the remaining height of the vessel 10. A sand-cleaning chamber 19 is provided above the baffle plate 13 and within a compartment 20 at the top of the vessel 10. The base of the chamber 19 is defined by plates 21 and 22 extending from the opposed edges of an outlet 23 of the chamber 19 to the side wall 15 of the vessel 10 and the baffle plate 13 respectively.

The vessel 10 contains a bed 24 of particulate filter material, in this example formed by sand, introduced into the vessel 10 via the chamber 19. The sand entering the vessel 10 joins an accumulated reserve 25 above the baffle plate 13 and sand from the bottom of the reserve 25 flows past the lower edge 14 of the baffle plate 13 which causes the bed 24 to have a free inclined upper surface 26. The sand flows downwardly over the inclined surface 26, with a rolling action, which causes the particles of sand to classify. Smaller particles tend to remain at the top of the slope whilst larger particles roll down the slope. Particles of sand entering the vessel 10 adjacent the side wall 15 tend to flow vertically downwards without segregation.

In use, liquid to be filtered is fed to the apparatus via a feed pipe 27, and enters the vessel 10 by flow over a weir plate 28, and underneath the baffle plate 13 so as to enter the bed 24 by way of the free inclined surface 26. The liquid is filtered by passing through the bed 24 after which it passes through a filtrate outlet in the form of a screen 29 in the side wall 15 of the vessel 10 and is led away through a pipe 30.

Whilst filtration is taking place, sand is continuously drawn from the base of the bed 24 into the pipe 12 and raised to the head of the bed 24 through a pipe 31, using the airlift principle, air being introduced into the pipe 12 by a supply line 32 for this purpose. Accordingly, the bed 24 is caused to move downwards continuously, relatively slowly. The pipe 31 discharges into the chamber 19. A portion of the water fed to the apparatus by the feed pipe 27 is led from the water side of the baffle plate 13 by a pipe 33, to the space above the sand reserve 25 over the baffle plate 13, at a position beneath the outlet 23 of the chamber 19 as wash water. This wash water may be controlled by means of a valve 34 and it will be understood that the wash water flows upwardly through the chamber 19 and washes the sand supplied to the chamber 19 by the pipe 31. The wash water, containing any contaminants washed out of the sand, overflows from the chamber 19 into the compartment 20, whence it flows away through a drain pipe 35.

Because of the classifying action described above, the particles of sand in the bed 24 are segregated with coarser particles at the water inlet side, finer particles inwardly therefrom and particles of full size range at the water outlet side. The approximate boundaries between these zones are indicated in the drawings by chain dotted lines. Because of this segregation the water being filtered passes generally through the coarser particles initially, then through the finer particles and finally through the mixed particles, which latter remain relatively clean on their passage downwards through the vessel 10. As a result the filtration process is very efficient and the bed 24 does not become rapidly blinded to prevent the free flow of liquid to the screen 29.

If desired, a further baffle 36 may be provided so as to produce a second free inclined surface 37 which has the effect of directing a layer of predominantly coarser particles downwardly over the filtrate outlet screen 29.

Referring now to FIG. 2, the apparatus there shown is generally similar to that of FIG. 1, like parts being indicated by like reference numerals. In this embodiment the filter bed 24 is of substantially circular horizontal cross-section and has a free inclined surface 26 of generally inverted conical form at its centre. The liquid to be filtered thus flows outwardly through the bed 24 from its centre for collection around the periphery of the filter vessel 10. The baffle plate 13 of the previously described embodiment is replaced by a right conical shell 38, liquid to be filtered being fed to the interior of the shell 38 by means of a pipe 39.

The sand of the bed 24 is re-cycled by being drawn from the base of the bed 24 by means of a plurality of angularly spaced pipes 12 and 31, each discharging into a single sand-cleaning chamber 19, the wash water overflowing the weir 40 to enter the compartment 20, which is annular, and flowing away through drain pipe 35.

If the filter bed 24 of either embodiment should become excessively contaminated for any reason, it is of course possible to backwash the same by introducing water at the base of the bed 24 or through the pipes 30.

It will be appreciated that the invention is not limited to the above examples only, many variations, such as might readily occur to one skilled in the art, being possible without departing from the scope of the following claims.

Instead of withdrawing material from the base of the bed continuously, material may be withdrawn intermittently. Similarly the liquid to be filtered may be introduced intermittently.

Material withdrawn need not be washed and recycled if fresh replacement material is supplied to the bed.

Of course, when using a circular vessel, the liquid to be filtered could flow towards the centre of the vessel, the filter bed then having an upright conical upper surface.

It will be understood that the apparatus disclosed will operate successfully with certain kinds of liquid to be filtered even though using a filter material comprised by particles of suitable identical size, but use of a filter material which will classify in the manner described is, of course, preferred.

If desired the filter material may be washed with a portion of the supply of liquid to be filtered after passage thereof through the filter bed.

What is claimed is:

1. A method of filtering a liquid comprising the steps of providing a bed of particulate material comprising particles of varying sizes and contained within a vessel, continually withdrawing material from the base of the bed, continually supplying replacement particulate material to the bed through an opening having an edge forming a boundary to said opening and past which the material flows, the vessel extending beneath the opening on either side of said edge whereby the bed has a freely formed inclined upper surface extending downwardly from said edge and where due to classification as the particles move down said surface an outer layer of predominately larger particles is formed over an inner layer or layers of predominately smaller particles beneath said outer layer, and causing the liquid to be filtered to enter the vessel through a duct separate from said opening for flow downwardly through the bed, the liquid entering the bed substantially only through said inclined upper surface for initial flow through said outer layer.

2. A method according to claim 1 wherein the material withdrawn from the bed is washed and returned to the bed as the replacement particulate material.

3. A method according to claim 2 wherein the material is washed with liquid taken from the supply of liquid to be filtered.

4. Apparatus for the filtration of liquid comprising a filtration vessel which contains a bed of particulate material comprising particles of varying sizes, means for continually withdrawing material from the base of the bed, means for continually supplying replacement particulate material to the bed through an opening having an edge forming a boundary to said opening and past which the material flows, the vessel extending beneath the opening on either side of said edge whereby the bed has a freely formed inclined upper surface extending downwardly from said edge and where due to classification as the particles move down said surface an outer layer of predominately larger particles is formed over an inner layer or layers of predominately smaller particles beneath said outer layer, and a duct separate from said opening to enable the liquid to be filtered to enter the vessel for downward flow through the bed, the liquid entering the bed substantially only through said inclined upper surface for initial flow through said outer layer.

5. Apparatus according to claim 4 wherein said particulate material comprises sand.

6. Apparatus according to claim 4 further including means to produce a second free inclined surface so disposed as to produce a layer of predominantly coarser particles over the filtrate outlet.

7. Apparatus according to claim 4 wherein means is provided for washing the material withdrawn from the bed and returning same to the bed to constitute the replacement particulate material.

8. Apparatus according to claim 7 wherein means is provided for washing the material with liquid taken from the supply of liquid to be filtered.

9. Apparatus according to claim 4 wherein said vessel is of circular cross-section, said opening is of annular shape and said edge is the peripheral edge of a baffle in the form of a right conical shell whose maximum diameter is less than the diameter of the vessel.

* * * * *